Figure 2:
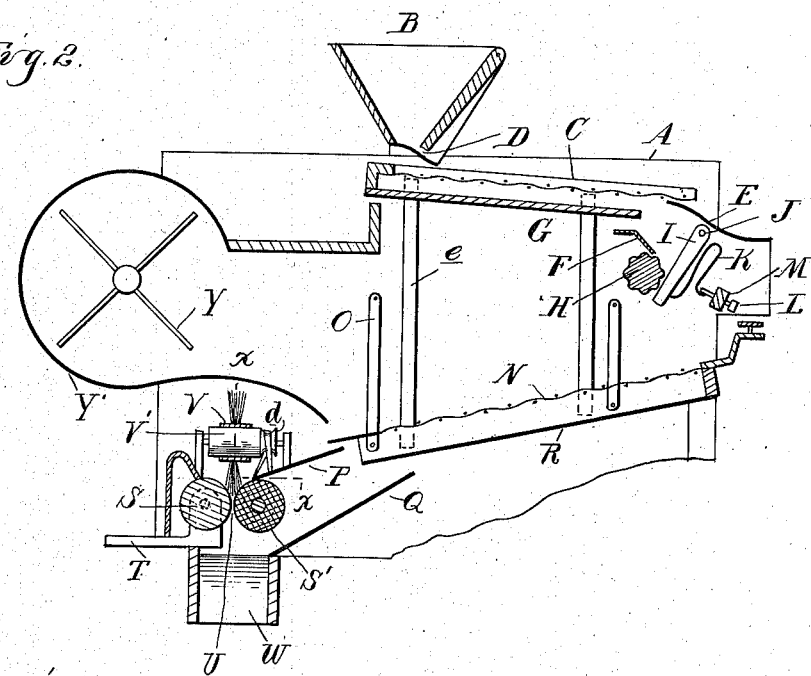

(No Model.) 2 Sheets—Sheet 1.

G. F. CRIPPEN.
BEAN PICKER AND CLEANER.

No. 552,748. Patented Jan. 7, 1896.

Witnesses
A. L. Stably
C. F. Bartlett

Inventor
George Franklin Crippen
By Wm. S. Sprague
Attys.

(No Model.) 2 Sheets—Sheet 2.
G. F. CRIPPEN.
BEAN PICKER AND CLEANER.
No. 552,748. Patented Jan. 7, 1896.
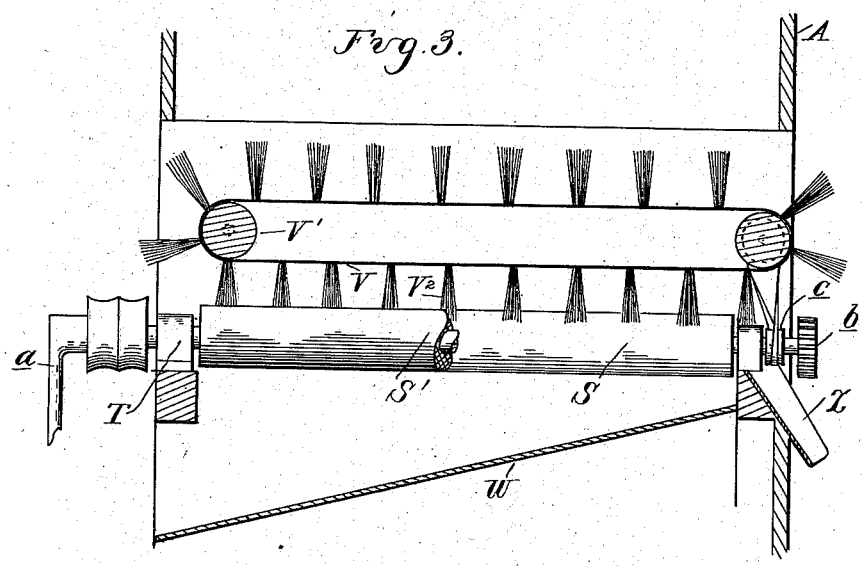
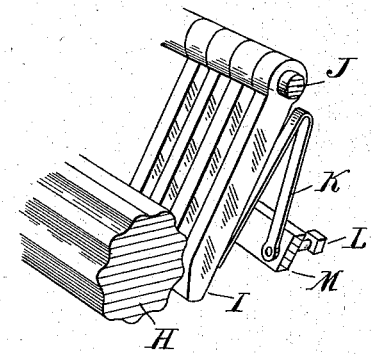
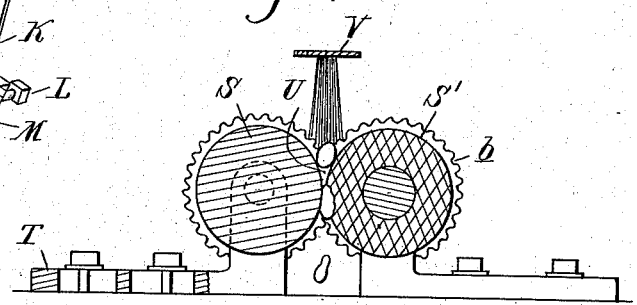

United States Patent Office.

GEORGE FRANKLIN CRIPPEN, OF YPSILANTI, MICHIGAN.

BEAN PICKER AND CLEANER.

SPECIFICATION forming part of Letters Patent No. 552,748, dated January 7, 1896.

Application filed April 16, 1895. Serial No. 545,848. (No model.)

*To all whom it may concern:*

Be it known that I, GEORGE FRANKLIN CRIPPEN, a citizen of the United States, residing at Ypsilanti, in the county of Washtenaw and State of Michigan, have invented certain new and useful Improvements in Bean Pickers and Cleaners, of which the following is a specification, reference being had therein to the accompanying drawings.

The object of this invention is to accomplish by mechanical means entirely the same perfect result in picking and cleaning beans as can be obtained by the most careful handpicking.

In hand-picking, all beans which are "off color" or have rusty spots or a shriveled appearance, but are otherwise perfect, are readily detected by the discriminating use of the human eye, but no machine has ever been invented which could discriminate in the same manner, and therefore hand-picking could never be dispensed with entirely when it was desired to obtain the product known as "handpicked beans," which always command the highest price.

I have discovered a way to separate entirely by mechanical means all such beans which required heretofore the discriminating use of the human eye. It is based upon the fact that all beans which are not perfect (when such imperfection is merely a difference from the normal color of the perfect bean) are always less smooth and glossy than the perfectly formed and ripened bean. This I have found to be such an absolute fact that a mechanical contrivance which is capable of discriminating between beans by the difference of the smoothness and slippery quality of the bean is a perfect mechanical substitute for the human eye in picking beans. To this end I convey the beans into contact with two rollers arranged and operating like two feed-rollers, with this difference that the slippery quality of the perfect beans prevents them from being drawn between the rollers, while imperfect beans being less slippery have sufficient frictional contact with the rollers to be carried through them.

My invention also embodies improved devices for cleaning the beans of all foreign matter and for scouring them clean of adhering mud or other matter, all as more fully hereinafter described, and shown in the drawings, in which—

Figure 1:
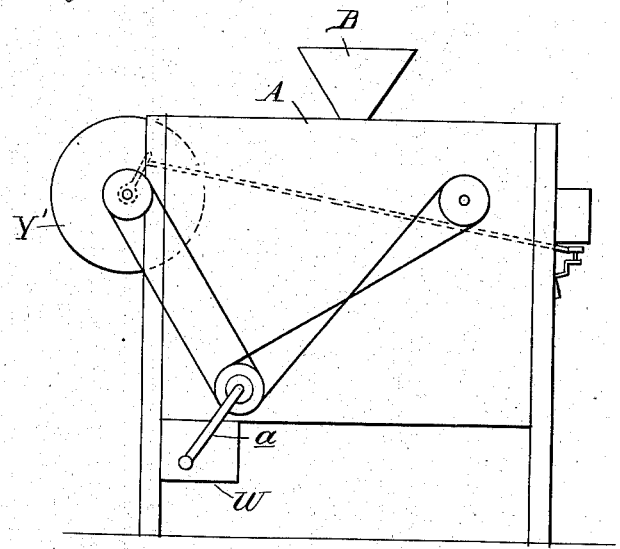

Figure 1 is a side elevation. Fig. 2 is a vertical longitudinal section. Fig. 3 is a cross-section substantially on line *x x* in Fig. 2; Fig. 4, an enlarged portion of Fig. 2, illustrating the operation of the parts; and Fig. 5 is a detail perspective view of some parts of the machine as indicated by the letters of reference.

A is a casing inclosing and supporting the operating parts of the machine in the usual manner.

B is the hopper through which beans are fed into the machine. It may be constructed in any known manner suitable for feeding the beans.

C is the upper inclined screen, upon which the beans are first delivered from the hopper through the opening D, and which is provided with any suitable means for agitating it.

E is a tail-board which receives and discharges the material which does not pass through the screen C.

F is another tail-board upon which falls the material which passes through the screen and is discharged from the bottom board G of the screen.

H is a roller provided with a longitudinally grooved or fluted surface upon which the beans are directed by the tail-board F.

I indicates a series of presser-bars pivoted upon the rod J, each presser-bar being independently held in contact with the roller by a spring K, the tension of which may be regulated by suitable screws L carried by the transverse bar M.

N is a lower screen inversely inclined to the screen C, and suitably suspended by hangers O and provided with agitating mechanism.

P is a tail-board which receives the material discharged from the lower end of the screen N.

Q is a tail-board which receives the material which passes through the screen N and is discharged from the bottom board R thereof.

S and S' are two rollers journaled transversely in bearings T and forming between them a throat U, into which the material is directed from the tail-board P. The roller S has a polished metallic surface, while S' has a rubber facing. The bearings T are preferably adjustably secured to permit of adjusting the rollers S S' nearer or farther apart.

V is an endless belt passing over suitable rollers V' and provided with brushes V² which traverse in the throat U between the rollers.

W is a discharge-spout below the rollers S S' and communicating also with the tail-board Q.

Y is a revolving fan inclosed in a casing Y'.

Motion for actuating the different parts is derived by the turning of a crank $a$, which is secured to the shaft of one of the rollers S S'. From there the motion is carried to the other roller by means of intermeshing gear-wheels $b$ at the opposite ends of the rollers, and also to the endless brush by means of the band-pulleys $c$ and $d$. Motion is also carried to the roller H and fan Y by means of suitable belts and pulleys. To the shaft of the fan Y is secured a suitable crank and connecting-rod to impart a vibrating motion to the screen N, and the upper screen C being secured to the lower screen N by suitable vertical supports $e$ a corresponding vibrating motion is imparted to it.

The parts being constructed as shown and described, they are intended to operate as follows: The beans from the hopper B are first discharged upon the upper screen C, which is of a large enough mesh to permit the beans to pass through it onto the bottom board G, but all the straw and chaff are retained and discharged by the movement of the screen onto the tail-board E. Everything that passes through the screen C is conveyed to the roller H and has to pass between it and the presser-bars I. These presser-bars are sufficiently close together to prevent the passage of good beans between them, but are sufficiently far apart for the passage of smaller material. The force with which each presser-bar is held against the roller H compels the beans to enter the grooves of the rollers in passing through, but all other material which is less smooth and capable of being crushed is broken up into fine particles, and at the same time a scouring action is exerted by the presser-bars upon the beans which frees them from all adhering mud. The beans and dirt together in being discharged from the roller onto the screen below have to pass through the air-current, which is created by the fan and passes below the roller H to the open end of the machine, and in falling through this air-current all material that is specifically lighter than the perfect beans is blown out. The screen N onto which the beans now drop has a sufficiently small mesh to retain the beans of perfect size, while all inferior beans and other débris which may still accompany it pass through the screen and are finally discharged into the discharge-spout W. The beans which pass over the screen N fall upon the tail-board P, which directs them into the throat V formed between and on top of the two rollers. The two rollers S S' move toward each other as regards that portion forming the sides of the throat V, and their tendency is therefore to draw the beans between the rolls and pass them through. The arrangement of these rollers is, however, such as to enable only those beans to pass which have a greater frictional adhesion to the rollers than the perfect beans, which on account of their glossy surface and consequent slippery quality resist being drawn between the rolls and are therefore carried by the brushes to the discharge-spout Z, suitably arranged at the end of the rollers and carrying the perfect beans to the outside of the machine, while the imperfect beans are carried into the discharge-spout W below. The proper construction of the rolls S and S' to thus discriminate between the perfect and imperfect beans simply on the degree of frictional contact of such beans is not difficult to obtain, and it is obvious that the two rolls must be close enough together to prevent the beans from entering too deep into the throat between the rollers. The best solution is obtained by giving one roller a polished metal surface and by facing the other with rubber, preferably of a suitable thickness to permit a free action of the rollers to let such beans pass between as the action of the rollers is intended to separate. This construction also gives the beans different frictional contact with the rollers and they will be therefore turned over and over in the trough between the rollers, so that if they should be only defective on part of their surface they will be acted upon nevertheless in the manner described. If two rubber rolls are used this rolling effect of the beans cannot be properly attained, for there are two gripping-surfaces and every small bean will go through. Where, however, a hard polished surface and a rubber-surfaced roll are used, all the smooth beans, of whatever size, can roll over, being turned by the rubber roll and free to turn on the smooth surface of the metal roll, and just as long as this takes place just so long will the beans not be drawn between. Now, if in this rolling process a soft or a rough spot exists in the bean, then it will be forced through the rolls just as soon as this spot comes in contact with the yielding rolling-surfaces. Thus this combination will discriminate between beans of all sizes and pick them out—the bad from the good ones, the soft and the rough beans and the partly-defective beans—regardless of size. The brushes may act only as carriers, but they may be made to assist the action of the rollers by a slight pressure upon the beans.

As regards the operation of the rollers S S', it is as discriminating in regard to the superficial imperfections of beans as the human eye itself, and it enables me to produce with my machine as perfect an article as can be obtained by the most careful hand-picking.

The rollers S S' constitute a friction feed device in which the passage of the beans is contingent upon the degree of relative frictional contact between the bean and two oppositely-inclined surfaces of the device when freely brought into contact with each other. Any device operating in this manner would be an equivalent of the rollers S S', and it will be seen that a device comprising a roller and bars, such as the roller H and bars I of Figs. 2 and 5, could be substituted therefor provided a suitably smooth surface would be given to the roller H.

What I claim as my invention is—

1. In a bean picking machine, the combination with the associated parts of the machine comprising primary separating means, of means for separating the good from the bad beans comprising two rolls arranged parallel, one having a yielding surface and one an unyielding surface, a discharge at the end of the rolls, and means for rotating the rolls, substantially as described.

2. In a bean picking machine, the combination with the associated parts of the machine comprising primary separating means, of means for separating the good from the bad beans comprising two rolls arranged parallel, one having a yielding surface and one an unyielding surface, a discharge at the end of the rolls, a flexible belt above the rolls, means for driving the belt, flexible brushes on the belt working in the space between the rolls, and means for rotating the rolls, substantially as described.

3. In a bean picker, the combination of the following elements, the casing provided with a feed hopper, the oppositely inclined upper and lower screens C, N, of different mesh, the grooved feed roller H interposed between the screens and provided with independently movable presser bars I, the revolving fan Y, the friction feed rollers S S' and the endless carrier belt operating above and in the throat between the two rollers, all arranged and adapted to operate, substantially as described.

In testimony whereof I affix my signature in presence of two witnesses.

GEORGE FRANKLIN CRIPPEN.

Witnesses:
TRACY L. TOWNER,
A. ED. MEYER.